US006940913B2

(12) United States Patent
Verbin et al.

(10) Patent No.: US 6,940,913 B2
(45) Date of Patent: Sep. 6, 2005

(54) COMMUNICATION START-UP WITH VARIANT SPECTRAL DENSITY MASK

(75) Inventors: Rami Verbin, Tel Aviv (IL); Ilan Sharfer, Rehovot (IL); Osnat Neulender, Kfar Saba (IL)

(73) Assignee: Tioga Technologies, Inc., San Jose, CA (US)

( * ) Notice: Subject to any disclaimer, the term of this patent is extended or adjusted under 35 U.S.C. 154(b) by 742 days.

(21) Appl. No.: 09/825,189

(22) Filed: Apr. 3, 2001

(65) Prior Publication Data

US 2002/0075952 A1 Jun. 20, 2002

Related U.S. Application Data

(60) Provisional application No. 60/194,392, filed on Apr. 4, 2000, and provisional application No. 60/259,965, filed on Dec. 20, 2000.

(51) Int. Cl.[7] .............................................. H04L 27/28
(52) U.S. Cl. ...................................................... 375/260
(58) Field of Search ................................ 375/222, 231, 375/259, 260, 284, 285, 350

(56) References Cited

U.S. PATENT DOCUMENTS 5,559,723 A * 9/1996 Mourot et al. ............... 375/350
5,636,244 A * 6/1997 Goodson et al. ............. 375/231
5,949,819 A * 9/1999 Bjarnason et al. ........... 375/222
6,219,378 B1 * 4/2001 Wu ............................. 375/231
6,332,009 B2 * 12/2001 Olafsson ..................... 375/358

OTHER PUBLICATIONS

Recommendation G.992.1 (ex–G.dmt) of the International Telecommunication Union (ITU), Annex A & B, pp. 138–166, Jul. 1999.
Osnat Neulender, "A High–Performance ADSL Over POTS Mask Which is Compatible With FDD ADSL Over ISDN", 8 pages, Feb. 28–Mar. 3, 2000, Orckit Communications LTD., ETSI STC TM6, Montreux, Switzerland.

* cited by examiner

Primary Examiner—Betsy L. Deppe
(74) Attorney, Agent, or Firm—Ladas & Parry LLP

(57) ABSTRACT

A method is provided for initiating communications over a channel between a transmitter and a receiver within a specified spectral range, subject to a mask to be applied at the transmitter so as to attenuate at least one segment of the spectral range. The method includes providing to the receiver a definition of the at least one segment and of a level of attenuation to be applied within the at least one segment during a training interval of the communications. A training signal is transmitted from the transmitter to the receiver while applying to the training signal the level of attenuation within the at least one segment. The receiver compensates for a response of the channel based on the received training signal and on the definition of the at least one segment and of the level of attenuation.

30 Claims, 2 Drawing Sheets

COMMUNICATION START-UP WITH VARIANT SPECTRAL DENSITY MASK

CROSS-REFERENCE TO RELATED APPLICATIONS

This application claims the benefit of U.S. Provisional Patent Application No. 60/194,392, filed Apr. 4, 2000, and of U.S. Provisional Patent Application No. 60/259,965, filed Dec. 20, 2000. Both of these applications are incorporated herein by reference.

FIELD OF THE INVENTION

The present invention relates generally to high-speed data communication systems, and specifically to Asymmetric Digital Subscriber Line (ADSL) systems.

BACKGROUND OF THE INVENTION

Digital Subscriber Line (DSL) is a modem technology that enables broadband digital data to be transmitted over twisted-pair wire, which is the type of infrastructure that links most home and small business subscribers to their telephone service providers. DSL modems enable users to access digital networks at speeds tens to hundreds of times faster than current analog modems and basic ISDN service. A range of DSL standards have been defined, known generically as "xDSL," wherein the various standards have different data rates and other associated features but share common principles of operation.

The present patent application is concerned primarily with Asymmetric DSL (ADSL) service, which allows data to be conveyed downstream to the subscriber at a rate of about 8 Mbit/s, and to be returned upstream from the subscriber at about 640 kbit/s. ADSL is based on a discrete multi-tone (DMT) transmission system, in which data are encoded using 256 different "tones," each corresponding to a frequency band 4.3125 kHz wide. Recommendation G.992.1 (ex-G.dmt) of the International Telecommunication Union (ITU), which is incorporated herein by reference, specifies the physical layer characteristics of the ADSL interface to the subscriber line, including the allocation of the tones in the frequency spectrum to upstream and downstream service.

Annexes A and B of G.992.1 specify requirements for ADSL operation on telephone lines that are also used for "Plain Old Telephone Service" (POTS) or for ISDN (Integrated Services Digital Network) services. When operating over POTS, upstream ADSL service is allocated tones 6 through 31 (25.875 to 138 kHz). Downstream service may use all of tones 6 through 255 (25.875 up to 1104 kHz), as long as echo cancellation is applied in the upstream service range. Alternatively, downstream service may be limited to tones 32 through 255 if necessary to reduce near-end crosstalk (commonly referred to as "NEXT") with the tones of the upstream signals. The range below about 25 kHz is left for POTS audio signals. On the other hand, when operating over ISDN, the range below 138 kHz (corresponding to tones 0–31) is unavailable to ADSL, as it must be left clear for ISDN transmission in a lower band. Tones 32 through 63 are allocated to ADSL upstream transmission, while tones 32 through 255 are allocated to ADSL downstream transmission. In practical implementations, however, it is frequently necessary to limit the downstream transmission to an upper band, roughly covering the range of tones 64–255, in order to reduce NEXT noise.

A range of variations on the standard ADSL spectral profiles have been proposed, in order to increase the upstream and/or downstream data rates while reducing crosstalk interference. One option for this purpose is to introduce a "notch" in the downstream power spectral density (PSD) mask. A scheme of this sort was proposed, for example, by Neulender in "A high-performance ADSL over POTS mask which is compatible with FDD ADSL over ISDN," published as contribution TD-19 to the TM6 Standards Committee of the European Telecommunications Standards Institute (ETSI), February, 2000, which is incorporated herein by reference. The proposed mask allows both upstream and downstream ADSL service to use the lower frequency range (tones 6–31) when operating over POTS. The notch in the mask attenuates downstream signals in the range of tones 32–63, which are allocated only to upstream service in order to reduce the NEXT noise which disturbs the upstream signal of ADSL over ISDN service. The downstream signals above tone 64 are substantially unattenuated. When ADSL service is to be provided on an ISDN subscriber line, the lower range (tones 6–31) is simply switched out of both the upstream and the downstream ADSL PSD masks.

For efficient communications over a DSL channel (as well as other types of digital communication channels), it is necessary for the modems at either end of the channel to estimate and compensate for the channel characteristics. Typically, the modems automatically run through a standard start-up procedure for this purpose before beginning actual data communications. Each of the modems transmits a known training signal to the other. The receiving modem compares the received signal to the expected training signal in order to "learn" the channel characteristics. In ADSL modems, for example, the comparison is used to adaptively set the coefficients of digital equalization filters in order to compensate for distortion in the channel. Existing start-up procedures implicitly assume that the PSD mask applied to the signals is constant. Such procedures do not take account of the possibility that there might be an intentionally-induced notch, such as that proposed by Neulender.

SUMMARY OF THE INVENTION

It is an object of some aspects of the present invention to provide communication start-up procedures suitable for use when a notched PSD mask is applied to transmitted signals.

In preferred embodiments of the present invention, a transmitter applies a notched PSD mask to signals that it transmits over a channel to a receiver. Before beginning to learn and compensate for the response of the channel, the receiver is informed of the shape of the mask. In the absence of this information, the receiver would treat the low amplitude of the signals in the notch portion of the spectrum as though it were the result of severe attenuation in the channel itself. The receiver would estimate the channel response incorrectly, leading to improper setting of equalization filters and, consequently, poor data communications performance. In preferred embodiments of the present invention, however, the receiver takes the attenuation of the PSD mask into account, and is thus able to estimate the channel response accurately and reliably.

To make an accurate estimate of the channel response, the receiver must generally be able to detect signals over the entire spectral range of the transmitter, including the segment that is attenuated by the notch. Therefore, in a training procedure at start-up of communications, the transmitter transmits training signals to the receiver that include low-power signals in the range of the notch, in accordance with the mask shape information that was furnished to the receiver. Preferably, the training signals within the notch are of sufficiently low power to meet the constraints imposed by the PSD mask. Alternatively, if necessary, the power of the training signals within the notch is increased sufficiently above the mask constraint so as to enable the receiver to detect them. Since the training signal is transmitted for only a short time, the disturbance to other signals, due to NEXT, for example, is transient and will at worst cause a short burst of errors.

In the context of the present patent application and in the claims, the term "notch" is used to refer to substantially any intentional attenuation of a segment of a transmission band, regardless of the spectral width of the segment or the level of the attenuation. Although preferred embodiments are described herein with reference to ADSL and ISDN services and to specific spectral masks used for these services, the principles of the present invention may similarly be applied to other types of digital transmissions in which non-smooth PSD masks are used. Such masks may comprise one or more notches, or equivalently, a number of spectral segments to which different gains are applied, so that one of the segments may be considered to be attenuated relative to another. Therefore, the terms "attenuation" and "attenuation level" that are used in the specification and claims of the present patent application could equivalently be expressed as "gain" and "gain level."

There is therefore provided, in accordance with a preferred embodiment of the present invention, a method for initiating communications over a channel between a transmitter and a receiver within a specified spectral range, subject to a mask to be applied at the transmitter so as to attenuate at least one segment of the spectral range, the method including:

providing to the receiver a definition of the at least one segment and of a level of attenuation to be applied within the at least one segment during a training interval of the communications;

transmitting a training signal from the transmitter to the receiver while applying to the training signal the level of attenuation within the at least one segment;

receiving the training signal at the receiver; and compensating for a response of the channel based on the received signal and on the definition of the at least one segment and of the level of attenuation.

In a preferred embodiment, the communications include Asymmetric Digital Subscriber Line (ADSL) communications, and wherein the mask is applied to downstream ADSL signals, and the at least one segment of the spectral range in which the downstream signals are attenuated is set aside for transmitting upstream signals. Preferably, the at least one segment includes approximately the range of ADSL tones 32 through 63. Further preferably, the level of attenuation applied within the at least one segment is in a range between approximately 10 dB and 17 dB.

Preferably, providing the definition includes communicating the definition from the transmitter to the receiver prior to transmitting the training signal. Most preferably, communicating the definition includes identifying first and second edge frequencies defining bounds of the at least one segment and conveying a level of the attenuation between the bounds. Alternatively, communicating the definition includes conveying an indication of power spectral density at each of a plurality of frequency points within the at least one segment.

Preferably, providing the definition includes determining the level of attenuation so as to enable reliable detection of the training signal by the receiver within the at least one segment of the spectral range. Most preferably, determining the level of attenuation includes setting the level so that the training signal substantially conforms to the mask. Alternatively, determining the level of attenuation includes setting the level so that the training signal has a higher amplitude within at least a portion of the at least one segment than is provided by the mask. Preferably, the method includes increasing the level of attenuation after the response of the channel has been estimated, so that signals transmitted thereafter by the transmitter do not exceed the amplitude within the at least one segment that is provided by the mask.

Preferably, compensating for the response of the channel includes correcting a value of the received signal based on the level of attenuation, and using the corrected value in determining the response. Further preferably, correcting the value of the received signal includes adjusting a level of the received signal at each of a set of carrier tones based on the level of attenuation at each of the carrier tones. Most preferably, providing the definition includes providing an indication of a power spectral density (PSD) function, and correcting the value includes dividing the value by a square root of a ratio between a value of the PSD function at a given carrier tone and a nominal PSD level. Additionally or alternatively, using the corrected value includes adaptively determining coefficients of a digital filter responsive to the corrected value.

There is also provided, in accordance with a preferred embodiment of the present invention, communication apparatus, including:

a transmitter, which is adapted to transmit communication signals over a channel within a specified spectral range while applying a mask to the signals so as to attenuate at least one segment of the spectral range, and which is further adapted, in a training interval prior to transmitting the communication signals, to transmit a training signal subject to a predefined level of attenuation within the at least one segment; and a receiver, which is coupled to receive the training signal and subsequently to receive the communication signals, and which is adapted to compensate for a response of the channel based on the received training signal and on a definition provided to the receiver of the at least one segment and of the level of attenuation within the at least one segment, and to apply the response thus estimated in processing the communication signals.

The present invention will be more fully understood from the following detailed description of the preferred embodiments thereof, taken together with the drawings in which:

DETAILED DESCRIPTION OF PREFERRED EMBODIMENTS

Figure 1:
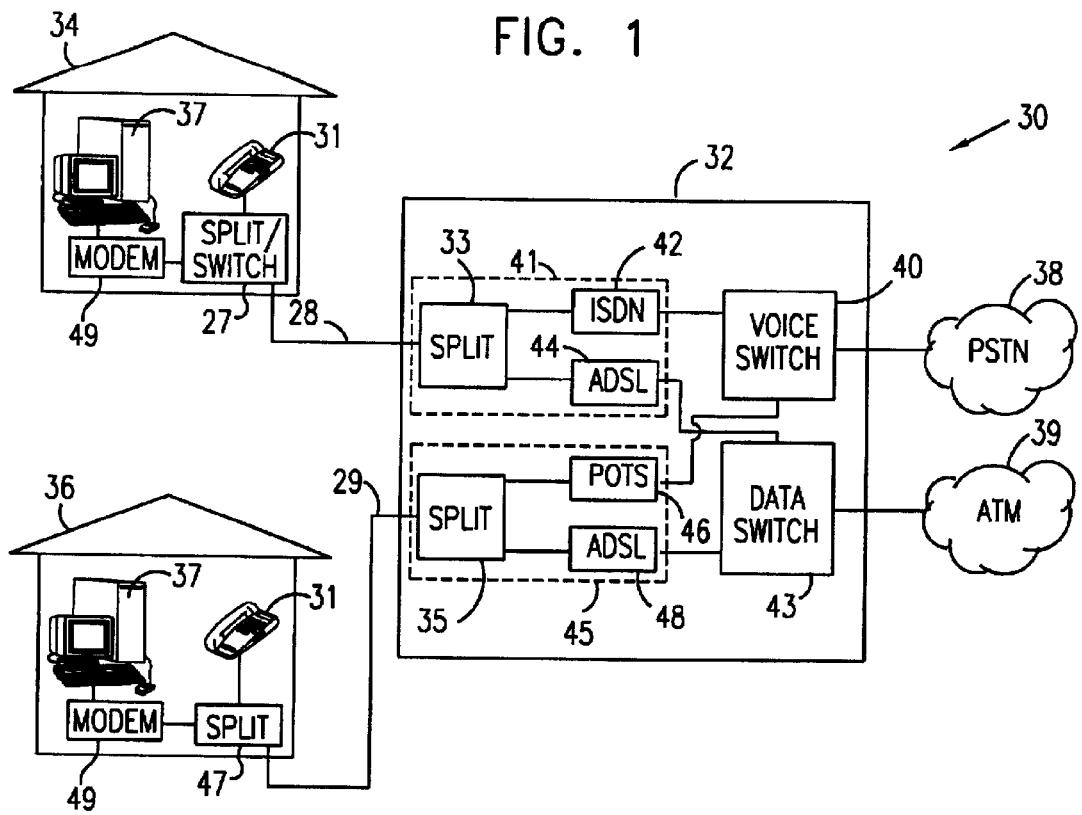
FIG. 1 is a block diagram that schematically illustrates a system for providing ADSL, ISDN and POTS services, in accordance with a preferred embodiment of the present invention.

Reference is now made to FIG. 1, which is a block diagram that schematically illustrates a system 30 for providing a mixture of subscriber loop services to subscribers, in accordance with a preferred embodiment of the present invention. The subscribers include typical subscribers 34 and 36, who are served by a central office 32 over respective subscriber lines 28 and 29. These lines connect to respective subscriber line equipment 41 and 45 in office 32. Equipment 41 includes a splitter 33, communicating with an ISDN modem 42 and an ADSL modem 44, so as to provide subscriber 34 with both ISDN and ADSL digital services, in accordance with Annex B of the ITU-T Recommendation G.992.1. Equipment 45 includes a splitter 35, communicating with a POTS link 46 and an ADSL modem 48, so as to provide subscriber 36 with voice telephony and ADSL digital services. Voice switching circuitry 40 in the central office links the ISDN and POTS subscriber equipment to a network 38, typically a public switched telephone network (PSTN). Data switching circuitry 43, such as an Asynchronous Transfer Mode (ATM) or frame relay concentrator, links the ADSL equipment to a data network 39.

Subscribers 34 and 36 typically have a telephone 31 and a computer 37 with a suitable modem 49, as well as other, optional equipment, connected to respective lines 28 and 29. Subscriber 36 uses a splitter 47, as is known in the art, to separate the POTS service from ADSL data on line 29 and route the signals to telephone 31 and computer 37 accordingly. Subscriber 34 uses a switchable splitter 27 to perform several functions: (1) dividing ISDN signals between telephone 31 and computer 37; (2) separating the ISDN service from the ADSL data; and (3) assuming that the computer has both ISDN and ADSL modems, selecting whether the computer is to receive ISDN or ADSL service. Optionally, splitter 27 is further switchable such that a lower frequency band (typically ADSL tones 0–31) may be switched between ISDN and ADSL service, as described hereinbelow. Such a splitter can then also perform the function of POTS splitter 47. The selection of ISDN or ADSL service may be performed manually or under software control.

Figure 2:
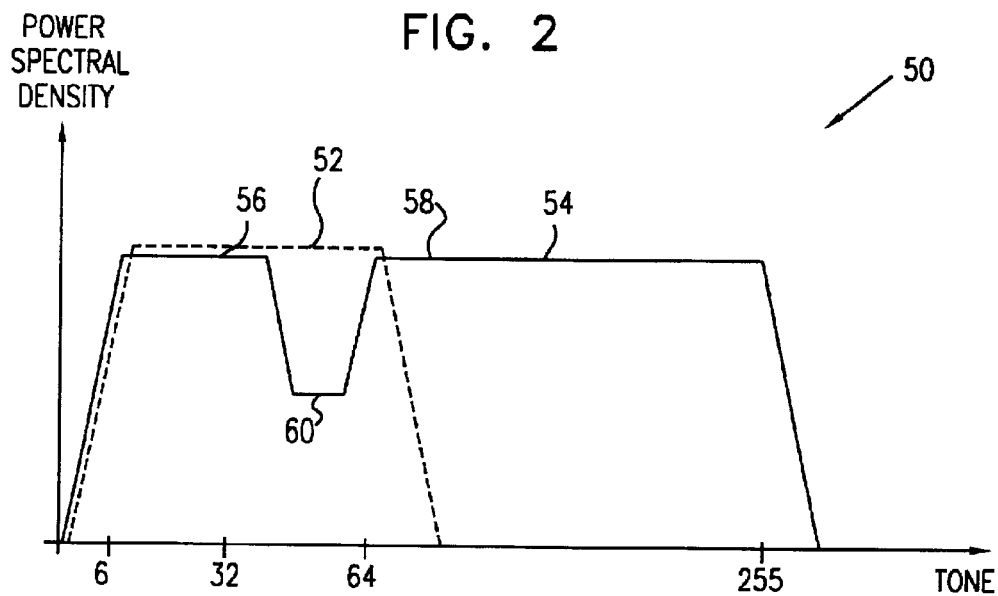
FIG. 2 is a schematic diagram showing notched spectral masks for ADSL transmissions, for use in the system of FIG. 1.

FIG. 2 is a schematic, simplified diagram showing spectral masks 50 applied to ADSL signals transmitted between central office 32 and subscriber 36. These masks are similar to those described in the above-mentioned contribution by Neulender. The use of these masks and possible configurations of the equipment in system 30 for working with these masks are described in detail in U.S. patent application Ser. No. 09/451,541, now U.S. Pat. No. 6,741,604, which is assigned to the assignee of the present patent application and whose disclosure is incorporated herein by reference. The signals transmitted between the central office and subscriber 34, who also receives ISDN service, are in accordance with G.992.1 Annex B. Masks 50, however, differ from the standard Annex A masks in the following manner:

An upstream mask 52 extends from tone 6 to about tone 63 (25.875 to 276 kHz). Optionally, mask 52 may be extended down to tone 0. Alternatively, mask 52 may be limited to the range of tones up to tone 31, since many existing ADSL systems are not capable of supporting upstream transmission above tone 32.

A downstream mask 54 comprises a lower portion 56, extending from tone 6 to about tone 31 (25.875 to 138 kHz) and an upper portion 58 from tone 64 through tone 255 (276 kHz to 1104 kHz). In between portions 56 and 58, mask 54 is suppressed by at least 10 dB, and preferably by at least 40 dB, within a notch 60, in order to avoid crosstalk with upstream ADSL transmissions in this range on both lines 28 and 29. Optionally, lower portion 56 also extends down to tone 0.

When ADSL service is provided over POTS, masks 52 and 54 are used in their entirety for the ADSL transmissions. When ADSL service must share a line with ISDN, however, the range from tone 0 to 31 is canceled from the ADSL masks in order to comply with Annex B of G992.1.

Figure 3:
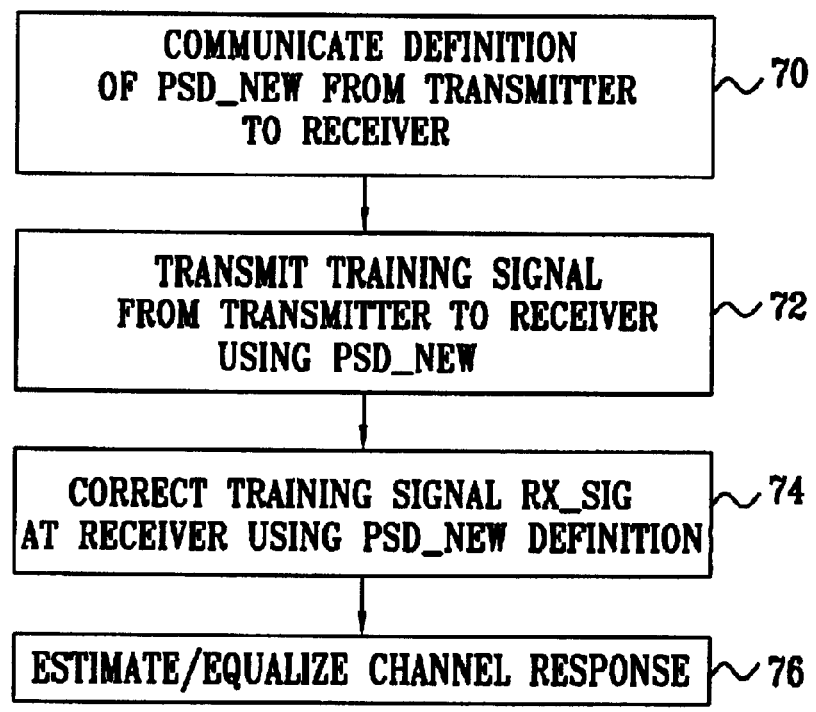
FIG. 3 is a flow chart that schematically illustrates a start-up procedure for use with a notched spectral mask, in accordance with a preferred embodiment of the present invention.

It will be appreciated that the limits of the bands in the upstream and downstream masks that are shown in FIG. 3 and described hereinabove are assigned for the purposes of convenience and compatibility with ADSL standards. In other embodiments of the present invention, these limits may be increased or decreased in accordance with application requirements. In particular, the limits may be varied so as to change the relative portions of the bandwidth that are allocated to upstream and downstream transmissions and to increase or decrease the edge frequencies, width and depth of notch 60. The terms "about" and "approximately," used in reference to the band limits in the present patent application and in the claims, should therefore be interpreted loosely.

FIG. 3 is a flow chart that schematically illustrates a training procedure used at start-up of communications between modems 48 and 49, subject to downstream mask 54, in accordance with a preferred embodiment of the present invention. For the purposes of the start-up phase, an initial PSD mask is defined, which is preferably identical to mask 54 but may, alternatively, differ from it slightly, typically by having a higher power level within notch 60. This initial PSD mask is referred to hereinafter as PSD_NEW. The power level in the notch of PSD_NEW should be just strong enough to allow reliable detection of the training signals by the receiver of modem 49, while remaining as close as possible to mask 54 in order to minimize degradation of reception (albeit temporary degradation) by neighboring modems.

The training procedure preferably begins with communication of the definition of PSD_NEW from the transmitter to the receiver (i.e., from modem 48 to modem 49), at a definition step 70. The definition may be in substantially any suitable form, such as a definition of the edges of notch 60 and the depth of the notch, a full definition of the notch in terms of power at each tone in the notch, or a full definition of the entire PSD mask in terms of power and corresponding tone index. The definition is preferably transmitted from the transmitter to the receiver at a low rate and using a suitable modulation scheme so that the receiver can receive and decode the definition successfully irrespective of the channel response. In the case of the G.992.1 ADSL standard, for example, the depth of the notch and the identification of the first and last tones in the notch are preferably communicated using the G.hs pre-startup protocol, for example, or using another procedure that precedes the modem training phase. Alternatively, the spectral mask to be used during the training phase may be preconfigured at both the transmitter and the receiver at the time of manufacture or installation. Although only one PSD_NEW mask is used in the present embodiment, alternative embodiments may use multiple masks for different signals that are transmitted during the training procedure.

When the receiver has the definition of PSD_NEW, the transmitter begins to transmit a suitable training signal, subject to the PSD_NEW mask, at a transmission step 72. Relating again to the example of ADSL, this training signal preferably comprises the REVERB signal defined in the G.992.1 standard. Notch 60 in PSD_NEW is preferably 10–17 dB deep. For the remaining signals in the start-up procedure and during normal transmission of data ("SHOWTIME"), PSD mask 54 is preferably used with the full level of attenuation in notch 60.

The receiver receives the training signal from the transmitter, and corrects the received signal level to account for the applied PSD_NEW mask, at a correction step 74. If the amplitude of the received signal is RX_SIG, then the corrected signal at each tone i will be given by $$RX\_SIG(i) / \sqrt{PSD\_NEW(i)/PSD\_NOM},$$

wherein RX_SIG(i) and PSD_NEW(i) respectively denote the received power and the transmit PSD level at tone number i, and PSD_NOM denotes a baseline PSD level used to normalize the results. The receiver uses the corrected signal in accurately estimating the channel response and/or setting suitable equalization filters, at an estimation step 76. Typically, the receiver comprises an adaptive equalizer, based on one or more digital filters. The coefficients of the filters are adjusted based on the corrected signal, using a least mean square (LMS) algorithm or any other suitable technique known in the art, so as to minimize the error in decoding the training signal at the receiver. Following the estimation of and adaptation for the channel response at step 76, the remainder of the start-up procedure between modems 48 and 49 proceeds in accordance with the standard, substantially without change.

Although preferred embodiments are described hereinabove with specific reference to ADSL service over ISDN, it will be understood that the principles of the present invention are similarly applicable to other high-speed digital transmission standards, and particularly to different combinations of xDSL services with other, lower-speed data services that share the same infrastructure. It will be further appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for initiating communications over a channel between a transmitter and a receiver within a specified spectral range, subject to a mask to be applied at the transmitter so as to attenuate at least one segment of the spectral range, the method comprising:

providing to the receiver a definition of the at least one segment and of a level of attenuation, wherein the level of attenuation is to be applied within the at least one segment during a training interval of the communications;

transmitting a training signal from the transmitter to the receiver such that the level of attenuation is applied to the transmitted training signal within the at least one segment;

receiving the training signal at the receiver; and compensating for a response of the channel based on the received signal and on the definition of the at least one segment and of the level of attenuation.

2. A method according to claim 1, wherein the communications comprise Asymmetric Digital Subscriber Line (ADSL) communications, and wherein the mask is applied to downstream ADSL signals, and wherein the at least one segment of the spectral range in which the downstream signals are attenuated is set aside for transmitting upstream signals.

3. A method according to claim 2, wherein the at least one segment comprises approximately the range of ADSL tones 32 through 63.

4. A method according to claim 2, wherein the level of attenuation applied within the at least one segment is in a range between approximately 10 dB and 17 dB.

5. A method according to claim 1, wherein providing the definition comprises communicating the definition from the transmitter to the receiver prior to transmitting the training signal.

6. A method according to claim 5, wherein communicating the definition comprises identifying first and second edge frequencies defining bounds of the at least one segment and conveying a level of the attenuation between the bounds.

7. A method according to claim 5, wherein communicating the definition comprises conveying an indication of power spectral density at each of a plurality of frequency points within the at least one segment.

8. A method according to claim 1, wherein providing the definition comprises determining the level of attenuation so as to enable reliable detection of the training signal by the receiver within the at least one segment of the spectral range.

9. A method according to claim 8, wherein determining the level of attenuation comprises setting the level so that the training signal substantially conforms to the mask.

10. A method according to claim 8, wherein determining the level of attenuation comprises setting the level so that the training signal has a higher amplitude within at least a portion of the at least one segment than is provided by the mask.

11. A method according to claim 10, and comprising increasing the level of attenuation after the response of the channel has been estimated, so that signals transmitted thereafter by the transmitter do not exceed the amplitude within the at least one segment that is provided by the mask.

12. A method according to claim 1, wherein compensating for the response of the channel comprises correcting a value of the received signal based on the level of attenuation, and using the corrected value in compensating for the response of the channel.

13. A method according to claim 12, wherein correcting the value of the received signal comprises adjusting a level of the received signal at each of a set of carrier tones based on the level of attenuation at each of the carrier tones.

14. A method according to claim 12, wherein providing the definition comprises providing an indication of a power spectral density (PSD) function, and wherein correcting the value of the received signal comprises dividing the value of the received signal by a square root of a ratio between a value of the PSD function at a given carrier tone and a nominal PSD level.

15. A method according to claim 12, wherein using the corrected value comprises adaptively determining coefficients of a digital filter responsive to the corrected value.

16. Communication apparatus, comprising:

a transmitter, which is adapted to transmit communication signals over a channel within a specified spectral range while applying a mask to the signals so as to attenuate at least one segment of the spectral range, and which is further adapted, in a training interval prior to transmitting the communication signals, to transmit a training signal subject to a predefined level of attenuation within the at least one segment; and a receiver, which is coupled to receive the training signal and subsequently to receive the communication signals, and which is adapted to process the communication signals by compensating for a response of the channel based on the received training signal and on a definition provided to the receiver of the at least one segment and of the level of attenuation within the at least one segment.

17. Apparatus according to claim 16, wherein the communication signals comprise Asymmetric Digital Subscriber Line (ADSL) signals that are transmitted in a downstream direction, and wherein the at least one segment of the spectral range in which the signals are attenuated is set aside for upstream transmission.

18. Apparatus according to claim 17, wherein the at least one segment comprises approximately the range of ADSL tones 32 through 63.

19. Apparatus according to claim 17, wherein the level of attenuation within the at least one segment is in a range between approximately 10 and 17 dB.

20. Apparatus according to claim 16, wherein the transmitter is adapted to communicate the definition to the receiver prior to transmitting the training signal.

21. Apparatus according to claim 20, wherein the definition communicated by the transmitter comprises an identification of first and second edge frequencies defining bounds of the at least one segment and a level of the attenuation between the bounds.

22. Apparatus according to claim 20, wherein the definition communicated by the transmitter comprises an indication of power spectral density at each of a plurality of frequency points within the at least one segment.

23. Apparatus according to claim 16, wherein the level of attenuation is determined so as to enable reliable detection of the training signal by the receiver within the at least one segment of the spectral range.

24. Apparatus according to claim 23, wherein the level of attenuation is determined so that the training signal substantially conforms to the mask.

25. Apparatus according to claim 23, wherein the level of attenuation is determined so that the training signal has a higher amplitude within at least a portion of the at least one segment than is provided by the mask.

26. Apparatus according to claim 25, wherein the transmitter is adapted to increase the level of attenuation after sending the training signal, so that signals transmitted thereafter by the transmitter do not exceed the amplitude within the at least one segment that is provided by the mask.

27. Apparatus according to claim 16, wherein the receiver is adapted to correct a value of the received training signal based on the level of attenuation, and to use the corrected value in compensating for the response of the channel.

28. Apparatus according to claim 27, wherein the receiver is adapted to correct the value of the received signal by adjusting a level of the received signal at each of a set of carrier tones based on the level of attenuation at each of the carrier tones.

29. Apparatus according to claim 27, wherein the definition comprises an indication of a power spectral density (PSD) function, and wherein to correct the value of the received training signal, the receiver divides the value of the received training signal by a square root of a ratio between a value of the PSD function at a given carrier tone and a nominal PSD level.

30. Apparatus according to claim 27, wherein the receiver comprises an adaptive digital filter, and is adapted to determine coefficients of the adaptive digital filter responsive to the corrected value.

\* \* \* \* \*